(12) United States Patent
Hedstrom et al.

(10) Patent No.: US 11,203,842 B2
(45) Date of Patent: Dec. 21, 2021

(54) TORQUE LIMITING DEVICE FOR ROAD MILLING MACHINE

(71) Applicant: Caterpillar Paving Products Inc., Brooklyn Park, MN (US)

(72) Inventors: Craig T. Hedstrom, Mounds View, MN (US); Brian J. Schlenker, Shoreview, MN (US); Nathan L. Mashek, Albertville, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 187 days.

(21) Appl. No.: 16/598,631

(22) Filed: Oct. 10, 2019

(65) Prior Publication Data

US 2021/0108684 A1 Apr. 15, 2021

(51) Int. Cl.
| | |
|---|---|
| *E01C 23/088* | (2006.01) |
| *E01C 23/12* | (2006.01) |
| *F16D 9/06* | (2006.01) |
| *F16H 35/10* | (2006.01) |
| *F16D 9/08* | (2006.01) |

(52) U.S. Cl.
CPC .......... *E01C 23/088* (2013.01); *E01C 23/127* (2013.01); *F16D 9/06* (2013.01); *F16D 9/08* (2013.01); *F16H 2035/103* (2013.01)

(58) Field of Classification Search
CPC ...... F16H 2035/103; F16H 35/10; F16D 9/00; F16D 9/06; F16D 9/08; E01C 23/088; E01C 23/127
USPC .......................................... 474/94, 152, 166
See application file for complete search history.

(56) References Cited

U.S. PATENT DOCUMENTS

| | | | | |
|---|---|---|---|---|
| 2,680,359 | A * | 6/1954 | Bowers | F16D 9/06 464/33 |
| 3,472,046 | A * | 10/1969 | Potter | F16D 9/06 464/32 |
| 5,000,720 | A * | 3/1991 | van der Lely | F16D 9/10 192/56.1 |
| 5,178,484 | A | 1/1993 | Strunk | |
| 5,383,743 | A * | 1/1995 | Swisher, Jr. | B60K 17/22 180/383 |

(Continued)

FOREIGN PATENT DOCUMENTS

| | | |
|---|---|---|
| CN | 201241307 | 5/2009 |
| CN | 206438378 | 8/2017 |
| DE | 3240127 | 5/1985 |

*Primary Examiner* — Janine M Kreck
*Assistant Examiner* — Michael A Goodwin
(74) *Attorney, Agent, or Firm* — Schwegman, Lundberg & Woessner; Jeff A. Greene (57) ABSTRACT

An apparatus includes a rotating drive component for a drive train, the rotating drive component comprising a first rotating element and a second rotating element, wherein the first rotating element and the second rotating element are arranged in a concentric arrangement such that the second rotating element is positioned within the first rotating element; and a shear element extending radially between and coupled to each of the first rotating element and the second rotating element, the shear element having a lower breaking strength than other components in the drive train, wherein if the shear element breaks, the first rotating element and the second rotating element are decoupled from each other and rotate independently of each other.

20 Claims, 5 Drawing Sheets

(56) References Cited

U.S. PATENT DOCUMENTS

| | | | | |
|---|---|---|---|---|
| 5,443,372 | A | * | 8/1995 | Kanoll ...................... F16D 9/06 417/319 |
| 5,800,137 | A | * | 9/1998 | Eitai ................... F04B 27/0895 403/2 |
| 2008/0156130 | A1 | * | 7/2008 | Vassaux .................... F16D 9/06 74/412 TA |
| 2016/0169361 | A1 | * | 6/2016 | Schafer ..................... F16H 7/02 299/39.4 |
| 2018/0002876 | A1 | | 1/2018 | Hirman et al. |
| 2019/0256196 | A1 | * | 8/2019 | Dinger ...................... F16D 9/06 |

\* cited by examiner

TORQUE LIMITING DEVICE FOR ROAD MILLING MACHINE

TECHNICAL FIELD

The present disclosure generally relates to a milling machine. More particularly, the present disclosure relates to a torque limiting device for a drive train.

BACKGROUND

Milling machines can include machines such as cold planers and reclaimers. Cold planers are powered machines used to remove at least part of a surface of a paved area such as a road, bridge, or parking lot. Typically, cold planers include a frame, a power source, a milling assembly positioned below the frame, and a conveyor system. The milling assembly includes a cutting rotor having numerous cutting bits disposed thereon. As power from the power source is transferred to the milling assembly by a drive train, this power is further transferred to the cutting rotor, thereby rotating the cutting rotor about its axis. As the rotor rotates, its cutting bits engage the hardened asphalt, concrete or other materials of an existing surface of a paved area, thereby removing layers of these existing structures. The spinning action of the cutting bits transfers these removed layers to the conveyor system which transports the removed material to a separate powered machine such as a haul truck for removal from a work site.

The drive train of the milling machine can subject to numerous impact loading events due to the nature of the milling process. This is due to the presence of hard materials as well as undetected buried objects in roadways such as water valves and manholes which the cutting rotor of the machine is likely to strike multiple times in the machine's life. When these impact events occur, the entire rotor drive train of the machine can experience very high torque loads which puts valuable components at risk to be damaged.

US 2018/0002876 discusses a drive system of a milling machine that includes a highly elastic coupling and a security shear pin, where the shear pin is positioned between a shaft of the driving system and the input end of the right-angled driving reduction gearbox.

SUMMARY

In an example according to this disclosure, an apparatus includes a rotating drive component for a drive train, the rotating drive component comprising a first rotating element and a second rotating element, wherein the first rotating element and the second rotating element are arranged in a concentric arrangement such that the second rotating element is positioned within the first rotating element; and a shear element extending radially between and coupled to each of the first rotating element and the second rotating element, the shear element having a lower breaking strength than other components in the drive train, wherein if the shear element breaks, the first rotating element and the second rotating element are decoupled from each other and rotate independently of each other.

In one example, a milling machine includes a frame holding a power source; a milling assembly including a drum housing and a cutting rotor; and a rotor drive train coupled between the power source and the cutting rotor; wherein the drive train includes a rotating drive component comprising a first rotating element and a second rotating element, wherein the first rotating element and the second rotating element are arranged in a concentric arrangement such that the second rotating element is positioned within the first rotating element; and a shear element extending radially between and coupled to each of the first rotating element and the second rotating element, the shear element having a lower breaking strength than other components in the drive train, wherein if the shear element breaks, the first rotating element and the second rotating element are decoupled from each other and rotate independently of each other.

In one example, a method of limiting torque in a drive train includes coupling a shear element to a rotating drive component of a drive train, wherein the rotating drive component includes a first rotating element and a second rotating element, wherein the first rotating element and the second rotating element are arranged in a concentric arrangement such that the second rotating element is positioned within the first rotating element, and the shear element extends radially between and is coupled to each of the first rotating element and the second rotating element, the shear element having a lower breaking strength than other components in the drive train; and the shear element breaking if a torque within the drive train exceeds the shear element's breaking strength, wherein if the shear element breaks the first rotating element and the second rotating element are decoupled from each other and rotate independently of each other.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
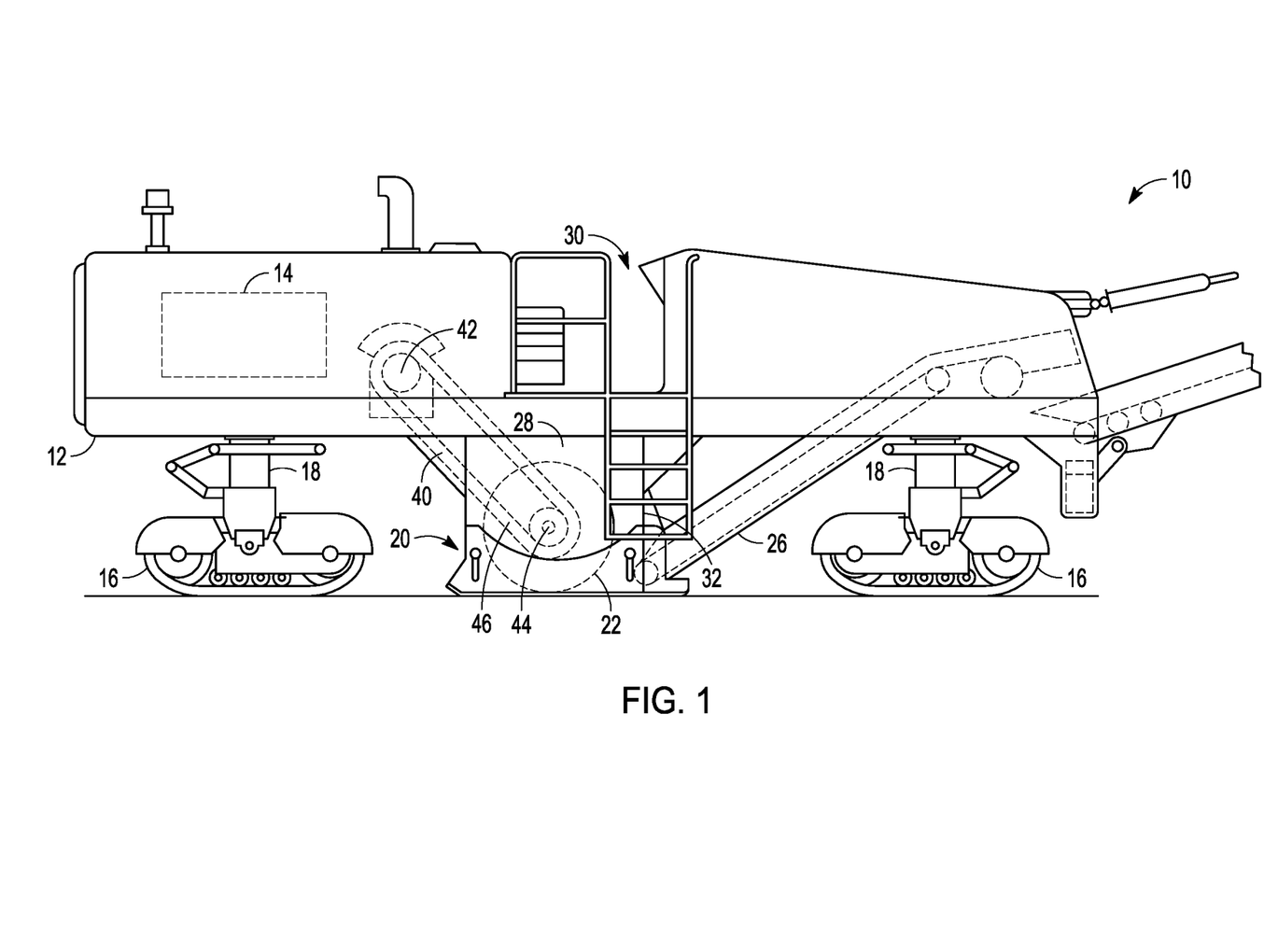
FIG. 1 shows a side view of a milling machine, in accordance with one embodiment.

FIG. 1 shows a side view of a milling machine 5, in accordance with one embodiment. In this example, the milling machine 5 is a cold planer 10. Aspects of the present system can also be applicable to other milling machines, such as a reclaimer for example. The cold planer 10 includes a frame 12, and a power source 14 connected to the frame 12. The power source 14 may be provided in any number of different forms including, but not limited to, Otto and Diesel cycle internal combustion engines, electric motors, hybrid engines and the like.

The frame 12 is supported by transportation devices 16 via lifting columns 18. The transportation devices 16 may be any kind of ground-engaging device that allows to move the cold planer 10 in a forward direction over a ground surface, for example a paved road or a ground already processed by the cold planer 10. For example, in the shown embodiment, the transportation devices 16 are configured as track assemblies. The lifting columns 18 are configured to raise and lower the frame 12 relative to the transportation devices and the ground.

The cold planer 10 further includes a milling assembly 20 connected to the frame 12. The milling assembly 20 includes a drum housing 28 holding a rotatable cutting rotor 22 operatively connected to the power source 14. The cutting rotor 22 can be rotated about a drum or housing axis extending in a direction perpendicular to the frame axis. As the rotatable cutting rotor 22 spins about its drum axis, cutting bits on the cutting rotor 22 can engage hardened materials, such as, for example, asphalt and concrete, of existing roadways, bridges, parking lots and the like. As the cutting bits engage such hardened materials, the cutting bits remove layers of these hardened materials. The spinning action of the rotatable drum 22 and its cutting bits then transfers the hardened materials to a first stage conveyor 26 via a discharge port 32 on the drum housing 28. The first stage conveyor 26 can be coupled to the frame 12 and located at or near the discharge port 32.

The cold planer 10 further includes an operator station or platform 30 including an operator interface for inputting commands to a control system for controlling the cold planer 10, and for outputting information related to an operation of the cold planer 10.

A rotor drive train 40 can be coupled between the power source 14 and the cutting rotor 22. The drive train 40 generally includes multiple rotating drive components, such as at least a first drive pulley 42 driven by the power source 14 and a second drive pulley 44 which drives the cutting rotor 22. A drive belt 46 extends between the first drive pulley 42 and the second drive pulley 44. In some example, the rotor drive train 40 can include multiple drive pulleys and drive belts in various configurations. Other applicable rotating drive train components that are in the drive train such as sprockets or other pullies or other rotating components can also use the present system.

As noted, the drive train 40 of the milling machine 5 can subject to numerous impact loading events due to the nature of the milling process. When these impact events occur, the entire rotor drive train 40 of the machine 5 can experience very high torque loads which puts valuable components at risk to be damaged. Moreover, although discussed herein for a cold planer, the present system is applicable in any machine drive train subject to an impact load.

The present system can help prevent this problem by inserting a shear element into the drive train 40. As will be explained below, the shear element is designed to break before a high torque load breaks any valuable components of the drive train 40. The shear element can be located anywhere in the drive train 40 that experiences torque, for example at a rotating drive component such as a sprocket or at either the first drive pulley 42 or the second drive pulley 44. Moreover, as noted, the drive train 40 can include a plurality of rotating drive components including multiple drive pulleys and sprockets in a complex arrangement, and a shear element can used at any of them that experience an impact load.

Figure 2:
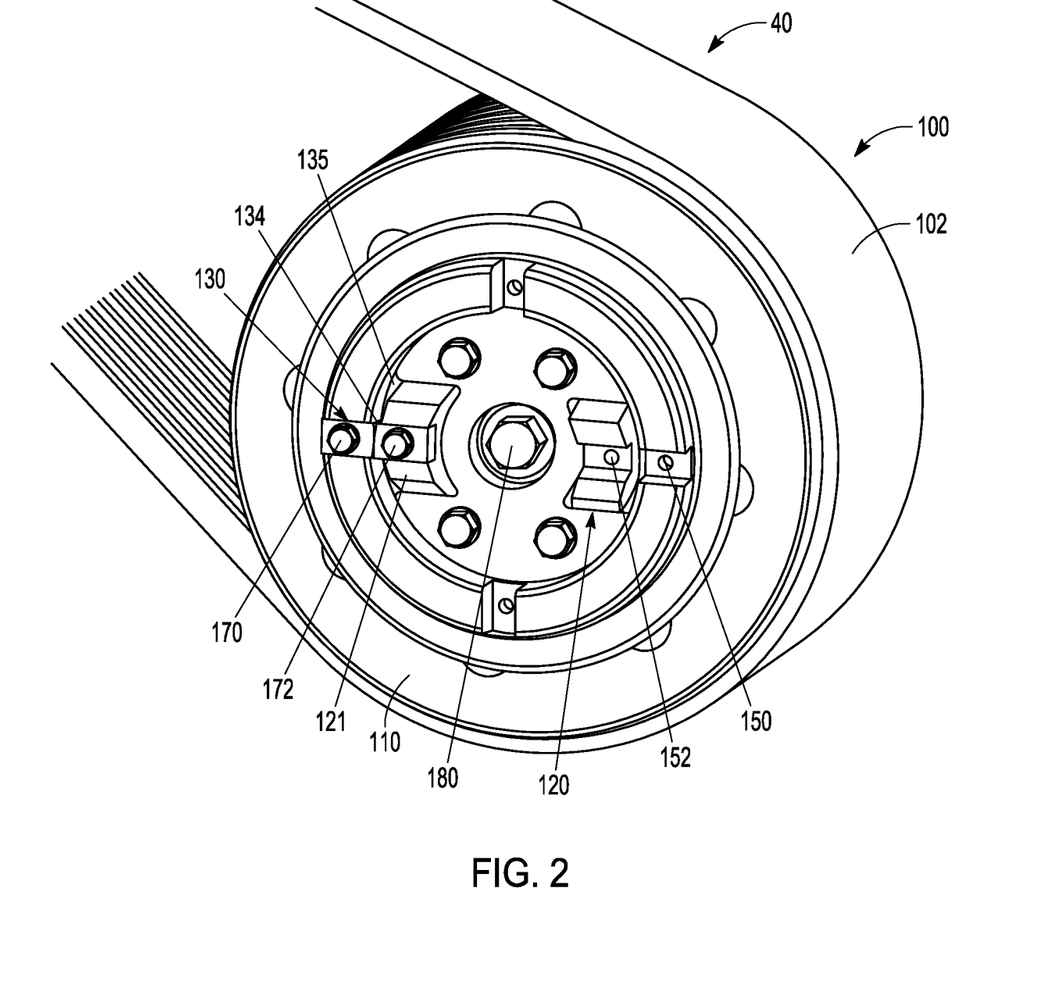
FIG. 2 shows a perspective view of a drive pulley for a drive train, in accordance with one embodiment.

FIG. 2 shows a perspective view of a drive pulley 100, in accordance with one embodiment. The drive pulley 100 is driven by a drive belt 102 and in turn drives another component in the drive train 40 of the milling machine. For example, the drive pulley 100 can be used as the first drive pulley 42 or the second drive pulley 44 of FIG. 1. In one example, drive pulley 100 can be coupled to cutting rotor 22 (FIG. 1) or other components in the drive train 40. Drive pulley 100 generally includes a first rotating element 110 and a second rotating element 120. The first rotating element 110 and the second rotating element 120 are arranged in a concentric arrangement such that the second rotating element 102 is positioned within the first rotating element 110 with a small gap 135 therebetween. When uncoupled the first rotating element 110 and the second rotating element 120 rotate independently of each other.

In this example, a shear element 130 extends radially between and is coupled to a front surface of each of the first rotating element 110 and the second rotating element 120. The shear element 130 is designed to have a lower breaking strength than other components in the drive train 40. Thus, if the shear element 130 breaks because of increased torque, the first rotating element 110 and the second rotating element 120 are decoupled from each other and rotate independently of each other. Thus, the shear element 130 is a sacrificial element to serve as a mechanical fuse and prevent damage and protect components during impact load situations. During an impact, the shear element 130 is designed to shear at a specific torque value which is lower than the breaking strength of the other components in the drive train 40. Once sheared, the two rotating elements 110, 120 previously coupled will become decoupled and rotate independently of each other, thus relieving the dramatic load spike and decoupling harmful upstream inertia from components.

In this example, the first rotating element 110 includes an outer pulley 111 configured to be driven by the drive belt 102. The second rotating element 120 includes a stub shaft 121 configured to be mounted to a further rotating component, such as another drive pulley in the drive train 40 or the cutting rotor 22 (FIG. 1). The shear element 130 is mounted to an exposed front surface of each of the first rotating element 110 and the second rotating element 120. The front surfaces of the two rotating elements 110, 120 are relatively flush so that the shear element 130 can be mounted easily and conveniently directly to the front surfaces. The placement of the shear element 130 extends perpendicular to the rotating axis of the drive pully 100. This enables ease of accessibility on drive components such as pulleys and shaft ends. This positioning on the accessible, exposed front surfaces potentially reduces the time to replace an element if sheared.

Figure 3:
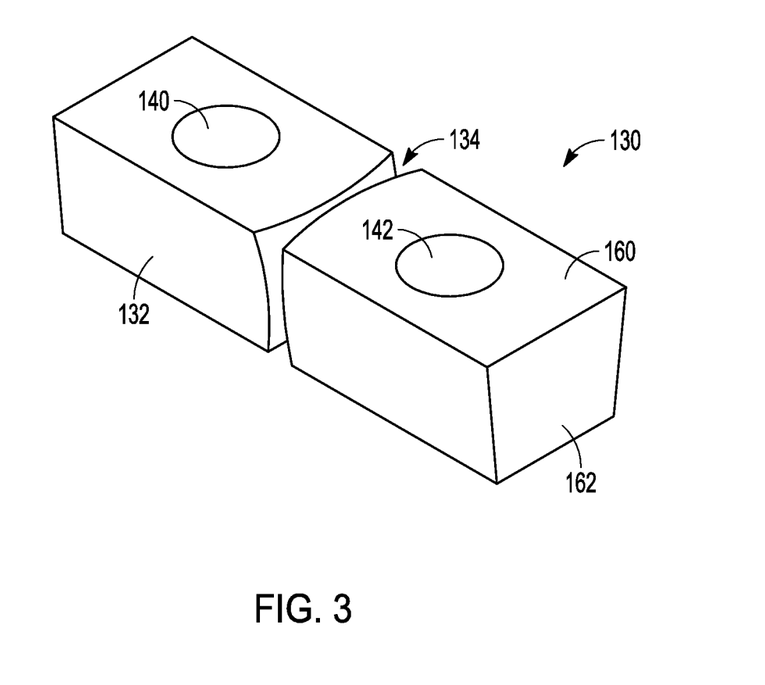
FIG. 3 shows a perspective view a shear element, in accordance with one embodiment.

FIG. 3 shows a perspective view of the shear element 130, in accordance with one embodiment. Here, the shear element 130 includes an elongate body 132 with a central notched region 134. The central notched region 134 is a cut-out region in the elongate body 132 which weakens the shear element 130. The notched region 134 can have various depths and shapes depending on the desired maximum torque that the shear element 130 is designed to withstand before breaking. The shape of the shear element 130 includes the notched region 134 which serves to determine both the location where the shear element 40 is to break and the torque rating to which it is designed to protect.

The shear element 130 includes two fastener holes 140, 142, with one hole positioned on each side of the central notched region 134 of the elongate body 132. Referring again to FIG. 2, the two fastener holes 140, 142 allow the shear element 130 to be mounted to the front surfaces of each of the first rotating element 110 and the second rotating element 120 by radially extending between them such that the central notched region 134 is located proximately between the two rotating elements 110, 120. The shear element 130 can be mounted to the rotating members 110, 120 using a pair of fasteners 170, 172, such as bolts. The shear element 130 is assembled with the two bolts 170, 172 which extend parallel to the rotating axis of the drive pulley 100.

As can be seen in FIG. 2, the first rotating element 110 includes a notch 150 and the second rotating element 120 includes a notch 152. When the notches 150 and 152 are aligned, the shear element 130 can be mounted within each of the notches 150, 152. The notches 150, 152 are deep enough so that the shear element 130 snuggly fits completely inside the notches 150, 152. Moreover, referring again to FIG. 3, the shear element 130 can include a wedge shape, where an upper surface 160 of the shear element 130 is wider that a lower surface 162 of the shear element 130. By providing the wedge shape, the shear element 130 sufficiently wedges in the notches 150, 152 such that the torque applied by the rotation of the drive pulley 100 is absorbed by the shear element 130 and is not transferred to the fasteners 170, 172. The wedge-shaped outer geometry provides a rigid union. Moreover, the shear element 130 is positioned and located relative to the first and second rotating elements 110, 120 such that the notched region 134 is at the gap 135 between the rotating elements 110, 120. Thus, the shear element 130 will break at that point.

The first and second rotating elements 110, 120 can include more than one of the notches 150, 152. Thus, if a shear element 130 breaks, a new one can be inserted in other unused notches 150, 152 without having to remove the broken shear element 130. In the present example, the first rotating element 110 includes four notches 150 arranged at 90 degrees apart around the front surface of the first rotating element 110, and the second rotating element 120 includes two notches 152 arranged across from each other on the front surface of the second rotating element 120.

In one example, the shear element 130 can be formed of a hardened steel so that the shear element 130 is relatively brittle and will break instead of stretching when a high torque load is applied.

Figure 4:
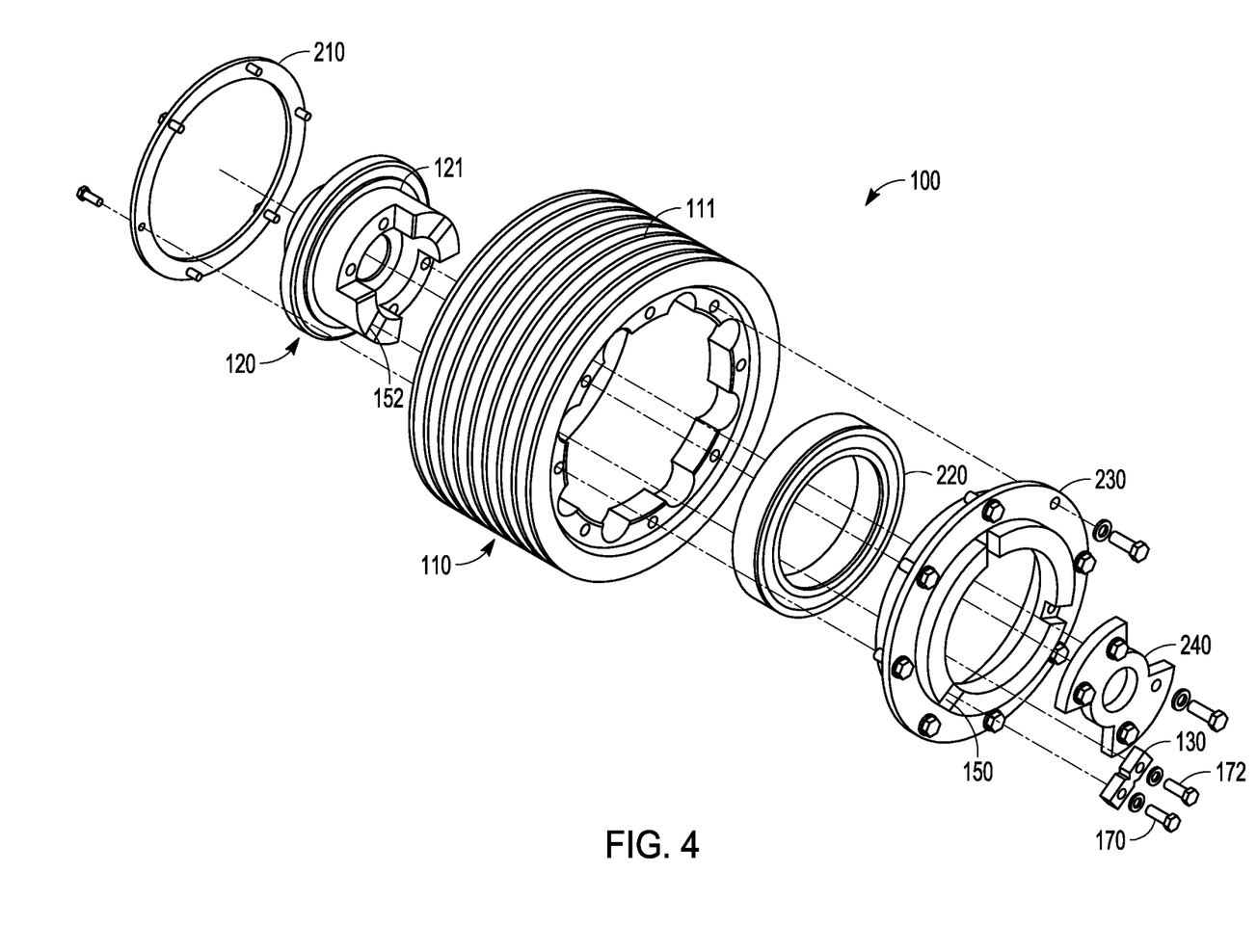
FIG. 4 shows an exploded view of the drive pulley of FIG. 2.

FIG. 4 shows an exploded view of various components of the drive pulley 100, in accordance with one embodiment. In this example, the drive pulley 100 generally can include a retaining plate 210, and the stub shaft 121, which is part of the second rotating element 120. The stub shaft 121 can be mounted to a rotating shaft of the drive train, such as a cutting rotor or other rotating component. The retaining plate 210 mounts to a rear side of the first rotating element 110 so as to hold the second rotating element 120 therein.

The drive pulley 100 further includes the outer pulley 111, which is part of the first rotating element 110, and a bearing 220 that mounts between the first rotating element 110 and the second rotating element 120 so that the two rotating components 110 and 120 can freely and independently rotate when not coupled together. The drive pulley 100 further includes a shear hub 230. The shear hub 230 attaches to the face of the outer pulley 111 to form the first rotating element 110. The shear hub 230 includes the one or more notches 150 to receive the shear element 130. The drive pully 100 further includes a front retainer 240 which attaches to the stub shaft 121 to form the second rotating element 120. A bolt 180 (FIG. 2) can mount the second rotating element 120 to a shaft, and the first rotating element 110 is coupled to the second rotating element 120 with the shear element 130 which is wedged within the notches 150, 152 and then fastened using fasteners 170, 172.

INDUSTRIAL APPLICABILITY

The present system is applicable to a milling assembly for a cold planer or a reclaimer. The milling assembly is suitable as a milling unit of a cold planer for removing at least part of a surface of a paved area such as a road, bridge, and a parking lot.

As noted, the rotor drive train of a milling machine can subject to numerous impact loading events due to the nature of the milling process. This is due to the presence of hard materials as well as undetected buried objects in roadways such as water valves and manholes which the cutting rotor of the machine is likely to strike multiple times in the machine's life. When these impact events occur, the entire rotor drive train of the machine can experience very high torque loads which puts valuable components at risk to be damaged.

The present system provides a technique to protect components during impact load situations. In the present system, a sacrificial element is provided to serve as a mechanical fuse and prevent damage. During an impact, the shear element 130 is designed to shear at a specific torque value which is lower than the breaking strength of the other components in the rotor drive train. Once sheared, the two concentrically positioned components previously coupled will become decoupled and rotate independently of each other, thus relieving the dramatic load spike and decoupling harmful upstream inertia from components.

Figure 5:
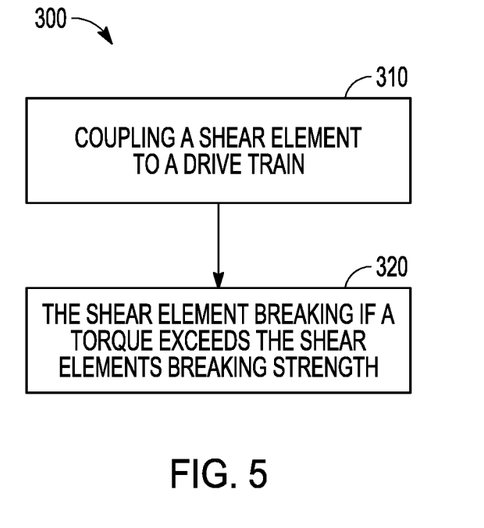
FIG. 5 shows a flowchart of a method of limiting torque in a drive train, in accordance with one embodiment.

FIG. 5 shows a method 300 of limiting torque in a drive train 40. Also referring to FIGS. 1-4, the method includes coupling (310) a shear element 130 to a drive train 40, where the drive train 40 includes a rotating drive component such as the drive pulley 100 having a first rotating element 110 and a second rotating element 120, wherein the first rotating element 110 and the second rotating element 120 are arranged in a concentric arrangement such that the second rotating element 120 is positioned within the first rotating element 110. The shear element 130 extends radially between and is coupled to each of the first rotating element 110 and the second rotating element 130. The shear element 130 has a lower breaking strength than other components in the drive train. The method further includes the shear element 130 breaking (320) if a torque within the drive train 40 exceeds the shear element's breaking strength. If the shear element 130 breaks the first rotating element 110 and the second rotating element 120 are decoupled from each other and rotate independently of each other.

As discussed above, the shear element 130 can include an elongate body 132 with a central notched region 134, and the shear element 130 can include two fastener holes 140, 142, with one hole positioned on each side of the central notched region 142 of the elongate body 132. The shear element 130 can include a wedge shape, with an upper surface 160 of the shear element 130 is wider that a lower surface 162 of the shear element. As discussed, the notched region serves to determine both the location where the shear element 130 is to break and the torque rating to which it is designed to protect.

Moreover, the placement of the shear element 130 extends perpendicular to the rotating axis which enables accessibility to the front surfaces of drive components such as pulleys and shaft ends. This potentially reduces the time to replace a sheared element if broken.

Also, as noted above, although discussed herein for a cold planer, the present system is applicable in any machine drive train subject to an impact load.

The above detailed description is intended to be illustrative, and not restrictive. The scope of the disclosure should, therefore, be determined with references to the appended claims, along with the full scope of equivalents to which such claims are entitled.

What is claimed is:

1. An apparatus comprising:
   a rotating drive component for a drive train, the rotating drive component comprising a first rotating element and a second rotating element, wherein the first rotating element and the second rotating element are arranged in a concentric arrangement such that the second rotating element is positioned within the first rotating element; and
   a shear element includes a wedge shape and extending radially between and coupled to each of the first rotating element and the second rotating element, the shear element having a lower breaking strength than other components in the drive train, wherein if the shear element breaks, the first rotating element and the second rotating element are decoupled from each other and rotate independently of each other.

2. The apparatus of claim 1, wherein the shear element includes an elongate body with a central notched region.

3. The apparatus of claim 2, wherein the shear element includes two fastener holes, with one hole positioned on each side of the central notched region of the elongate body.

4. The apparatus of claim 1, wherein an upper surface of the shear element is wider than a lower surface of the shear element.

5. The apparatus of claim 1, wherein the shear element is mounted to an exposed front surface of each of the first rotating element and the second rotating element.

6. The apparatus of claim 1, wherein the shear element is formed of a hardened steel.

7. The apparatus of claim 1, wherein the first rotating element includes an outer pulley configured to be driven by a drive belt, and the second rotating element includes a stub shaft configured to be mounted to a rotating component.

8. The apparatus of claim 1, wherein the drive train is coupled between a power source and a cutting rotor of a milling machine.

9. A milling machine comprising:
   a frame holding a power source;
   a milling assembly including a drum housing and a cutting rotor; and
   a rotor drive train coupled between the power source and the cutting rotor;
   wherein the drive train includes a rotating drive component comprising a first rotating element and a second rotating element, wherein the first rotating element and the second rotating element are arranged in a concentric arrangement such that the second rotating element is positioned within the first rotating element; and
   a shear element includes a wedge shape and extending radially between and coupled to each of the first rotating element and the second rotating element, the shear element having a lower breaking strength than other components in the drive train, wherein if the shear element breaks, the first rotating element and the second rotating element are decoupled from each other and rotate independently of each other.

10. The milling machine of claim 9, wherein the first rotating element includes an outer pulley configured to be driven by a drive belt.

11. The milling machine of claim 10, wherein the second rotating element includes a stub shaft configured to be mounted to a driven component within the drive train.

12. The milling machine of claim 11, wherein the driven component includes the cutting rotor of the milling machine.

13. The milling machine of claim 11, wherein the shear element includes an elongate body with a central notched region.

14. The milling machine of claim 13, wherein the shear element includes two fastener holes, with one hole positioned on each side of the central notched region of the elongate body.

15. The milling machine of claim 11, wherein an upper surface of the shear element is wider that a lower surface of the shear element.

16. The milling machine of claim 11, wherein the shear element is mounted to an exposed front surface of each of the first rotating element and the second rotating element.

17. A method of limiting torque in a drive train, the method comprising:
   coupling a shear element to a rotating drive component of a drive train, wherein the rotating drive component includes a first rotating element and a second rotating element, wherein the first rotating element and the second rotating element are arranged in a concentric arrangement such that the second rotating element is positioned within the first rotating element, and the shear element extends radially between and is coupled to each of the first rotating element and the second rotating element, the shear element having a wedge shape and a lower breaking strength than other components in the drive train; and
   the shear element breaking if a torque within the drive train exceeds the shear element's breaking strength, wherein if the shear element breaks the first rotating element and the second rotating element are decoupled from each other and rotate independently of each other.

18. The method of claim 17, wherein the shear element includes an elongate body with a central notched region, and the shear element includes two fastener holes, with one hole positioned on each side of the central notched region of the elongate body.

19. The method of claim 17, wherein an upper surface of the shear element is wider that a lower surface of the shear element.

20. The method of claim 17, wherein the shear element is mounted to an exposed front surface of each of the first rotating element and the second rotating element.

* * * * *